(12) United States Patent
Hu et al.

(10) Patent No.: US 11,916,846 B2
(45) Date of Patent: *Feb. 27, 2024

(54) LEFTOVER BITS PROCESSING FOR PROPORTIONAL ROUND-ROBIN RESOURCE UNIT PARSING IN EXTREME HIGH-THROUGHPUT SYSTEMS

(71) Applicant: MediaTek Singapore Pte. Ltd., Singapore (SG)

(72) Inventors: Shengquan Hu, San Jose, CA (US); Jianhan Liu, San Jose, CA (US); Thomas Edward Pare, Jr., San Jose, CA (US)

(73) Assignee: MediaTek Singapore Pte. Ltd., Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 17/975,875

(22) Filed: Oct. 28, 2022

(65) Prior Publication Data
US 2023/0051851 A1    Feb. 16, 2023

Related U.S. Application Data

(63) Continuation of application No. 17/189,227, filed on Mar. 1, 2021, now Pat. No. 11,515,987.

(Continued)

(51) Int. Cl.
H04L 5/00    (2006.01)

(52) U.S. Cl.
CPC .......... *H04L 5/0075* (2013.01); *H04L 5/0005* (2013.01)

(58) Field of Classification Search
CPC ... H04L 5/0075; H04L 5/0005; H04L 5/0042; H04L 5/0058; H04L 5/0044; H04W 28/06; H04W 84/12

See application file for complete search history.

(56) References Cited

U.S. PATENT DOCUMENTS 11,515,987 B2 *  11/2022  Hu .................... H04L 5/0042
2015/0349995 A1 * 12/2015  Zhang ............ H04L 27/26025
                                                                      375/295

(Continued)

FOREIGN PATENT DOCUMENTS

| CN | 106797295 A | 5/2017 |
|---|---|---|
| CN | 110690939 A | 1/2020 |
| WO | WO 2019173240 A1 | 9/2019 |

OTHER PUBLICATIONS

European Patent Office, European Search Report for European Patent Application No. EP21160692, dated Jul. 2, 2021.

(Continued)

*Primary Examiner* — Atique Ahmed
(74) *Attorney, Agent, or Firm* — Han IP PLLC; Andy M. Han

(57) ABSTRACT

A method pertaining to leftover bits processing for proportional round-robin resource unit (RU) parsing in extreme high-throughput (EHT) systems involves processing a stream of bits to provide processed bits. The method also involves transmitting the processed bits to a station (STA) over a combination of multiple resource units (RUs) assigned to the STA. In processing the stream of bits, the method may involve parsing the stream of bits to the combination of multiple RUs. Moreover, in an event of leftover bits remaining from the parsing, the method may further involve distributing the leftover bits to one or more RUs but not all RUs of the combination of multiple RUs.

19 Claims, 9 Drawing Sheets

Related U.S. Application Data

(60) Provisional application No. 62/986,867, filed on Mar. 9, 2020.

(56) References Cited

U.S. PATENT DOCUMENTS

| | | | | |
|---|---|---|---|---|
| 2016/0073387 | A1* | 3/2016 | Yang | H04L 5/0039 |
| | | | | 370/329 |
| 2016/0142187 | A1 | 5/2016 | Yang et al. | |
| 2018/0248591 | A1* | 8/2018 | Geng | H04B 7/0413 |
| 2019/0281614 | A1* | 9/2019 | Chen | H04L 5/0007 |
| 2020/0007265 | A1 | 1/2020 | Min et al. | |
| 2020/0305164 | A1* | 9/2020 | Yang | H04L 5/0042 |
| 2021/0227510 | A1* | 7/2021 | Hu | H04L 1/0071 |

OTHER PUBLICATIONS

Eunsung Park (LE Electronics): "Multiple RU Aggregation", IEEE Draft; 11-20-0023-02-00BE-Multiple-RU-Aggregation, IEEE-SA Mentor, Piscataway, NJ, USA, vol. 802.11 EHT; 802.11be, No. 2, Jan. 16, 202, pp. 1-26, XP068165425.

Taiwan Intellectual Property Office, Office Action for Taiwan Patent Application No. 110107491, dated Dec. 7, 2021.

China National Intellectual Property Administration, First Office Action in China Patent Application No. 202110236708.7, dated Jun. 15, 2023.

\* cited by examiner

| RU Combination | $N_{sd}$ total | Proportional Ratio ($m_0:m_1:m_2:m_3$) | Leftover Bits (per symbol) |
|---|---|---|---|
| 484 + 996 | 1448 | 1:2 | 44 * $N_{bpscs}$ on RU996 |
| (242+484) + 996 | 1682 | 3:4 | 44 * $N_{bpscs}$ on RU996 |
| 484 + 2 * 996 | 2428 | 1:2:2 | 44 * $N_{bpscs}$ on RU996 |
| 484 + 3 * 996 | 3408 | 1:2:2:2 | 44 * $N_{bpscs}$ on RU996 |
| 2 * 996 | 1960 | 1:1 | 0 |
| 3 * 996 | 2940 | 1:1:1 | 0 |
| 4 * 996 | 3920 | 1:1:1:1 | 0 |
| 484 + (242+484) | 1170 | 2:3 | 0 |
| (242+484) + (242+484) | 1404 | 1:1 | 0 |
| 242 + (484+242) | 936 | 1:3 | 0 |
| (242) + (484) | 702 | 1:2 | 0 |
| (242) + (996) | 1214 | 1:4 | 44 * $N_{bpscs}$ on RU996 |

FIG. 3

LEFTOVER BITS PROCESSING FOR PROPORTIONAL ROUND-ROBIN RESOURCE UNIT PARSING IN EXTREME HIGH-THROUGHPUT SYSTEMS

CROSS REFERENCE TO RELATED PATENT APPLICATION

The present disclosure is part of a Continuation of U.S. patent application Ser. No. 17/189,227, filed 1 Mar. 2021 and claiming the priority benefit of U.S. Provisional Patent Application No. 62/986,867, filed 9 Mar. 2020. Contents of aforementioned applications are herein incorporated by reference in their entirety.

TECHNICAL FIELD

The present disclosure is generally related to wireless communications and, more particularly, to leftover bits processing for proportional round-robin resource unit (RU) parsing in extreme high-throughput (EHT) systems.

BACKGROUND

Unless otherwise indicated herein, approaches described in this section are not prior art to the claims listed below and are not admitted as prior art by inclusion in this section.

In next-generation EHT systems such as wireless local area network (WLAN) systems in accordance with the upcoming Institute of Electrical and Electronics Engineers (IEEE) 802.11 be standard, it is permissible to assign an aggregated RU (herein interchangeably referred to as multi-RU) comprising multiple RUs to a single station (STA) to improve spectral efficiency. However, after filling up bits for RU(s) of smaller size(s) (e.g., RU484, which denotes a RU of 484 tones) in certain RU aggregation scenarios, there may be some leftover bits for larger RU(s) (e.g., RU996, which denotes a RU of 996 tones). There is, therefore, a need for a solution to handle leftover bits processing for such scenarios.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to provide schemes, concepts, designs, techniques, methods and apparatuses pertaining to leftover bits processing for proportional round-robin RU parsing in EHT systems.

In one aspect, a method may involve processing a stream of bits to provide processed bits. The method may also involve transmitting the processed bits to a STA over a combination of multiple RUs assigned to the STA. In processing the stream of bits, the method may involve parsing the stream of bits to the combination of multiple RUs. Moreover, in an event of leftover bits remaining from the parsing, the method may further involve distributing the leftover bits to one or more RUs but not all RUs of the combination of multiple RUs.

In another aspect, a method may involve processing a stream of bits to provide processed bits. The method may also involve transmitting the processed bits to a STA over a combination of multiple RUs assigned to the STA. The combination of multiple RUs may include at least one smaller RU and at least one larger RU with each of the at least one larger RU having more tones than the at least one smaller RU. In such cases, in processing the stream of bits, the method may involve parsing the stream of bits to the combination of multiple RUs in a proportional round-robin fashion. Moreover, in an event of leftover bits remaining from the parsing in the proportional round-robin fashion, the method may further involve distributing the leftover bits to the at least one larger RU.

It is noteworthy that, although description provided herein may be in the context of certain radio access technologies, networks and network topologies such as, Wi-Fi, the proposed concepts, schemes and any variation(s)/derivative(s) thereof may be implemented in, for and by other types of radio access technologies, networks and network topologies such as, for example and without limitation, Bluetooth, ZigBee, $5^{th}$ Generation (5G)/New Radio (NR), Long-Term Evolution (LTE), LTE-Advanced, LTE-Advanced Pro, Internet-of-Things (IoT), Industrial IoT (IoT) and narrowband IoT (NB-IoT). Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation to clearly illustrate the concept of the present disclosure.

FIG. 3 is a diagram of an example scenario in accordance with the present disclosure.

DETAILED DESCRIPTION OF PREFERRED EMBODIMENTS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to leftover bits processing for proportional round-robin RU parsing in EHT systems. According to the present disclosure, a number of possible solutions may be implemented separately or jointly. That is, although these possible solutions may be described below separately, two or more of these possible solutions may be implemented in one combination or another.

Figure 1:
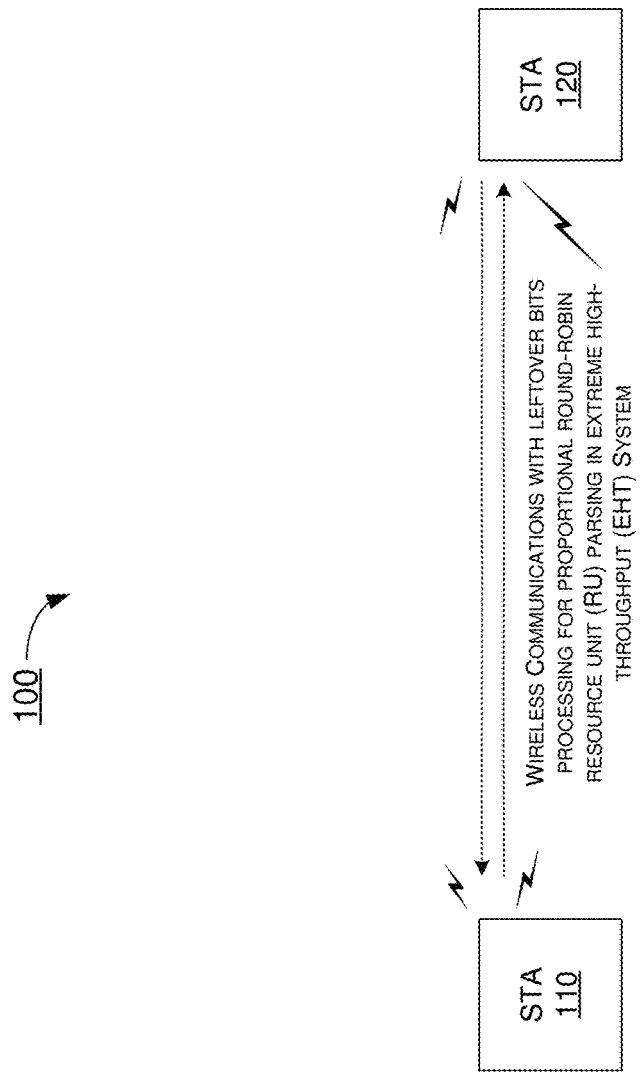
FIG. 1 is a diagram of an example network environment in which various solutions and schemes in accordance with the present disclosure may be implemented.

FIG. 1 illustrates an example network environment 100 in which various solutions and schemes in accordance with the present disclosure may be implemented. FIG. 2~FIG. 9 illustrate examples of implementation of various proposed schemes in network environment 100 in accordance with the present disclosure. The following description of various proposed schemes is provided with reference to FIG. 1~FIG. 9.

Referring to FIG. 1, network environment 100 may involve at least a STA 110 communicating wirelessly with a STA 120. Each of STA 110 and STA 120 may be a non-access point (non-AP) STA or, alternatively, either of STA 110 and STA 120 may function as an AP. In some cases, STA 110 and STA 120 may be associated with a basic service set (BSS) in accordance with one or more IEEE 802.11 standards (e.g., IEEE 802.11 be and future-developed standards). Each of STA 110 and STA 120 may be configured to communicate with each other with leftover bits processing for proportional round-robin RU parsing in EHT systems in accordance with various proposed schemes described below.

Figure 2:
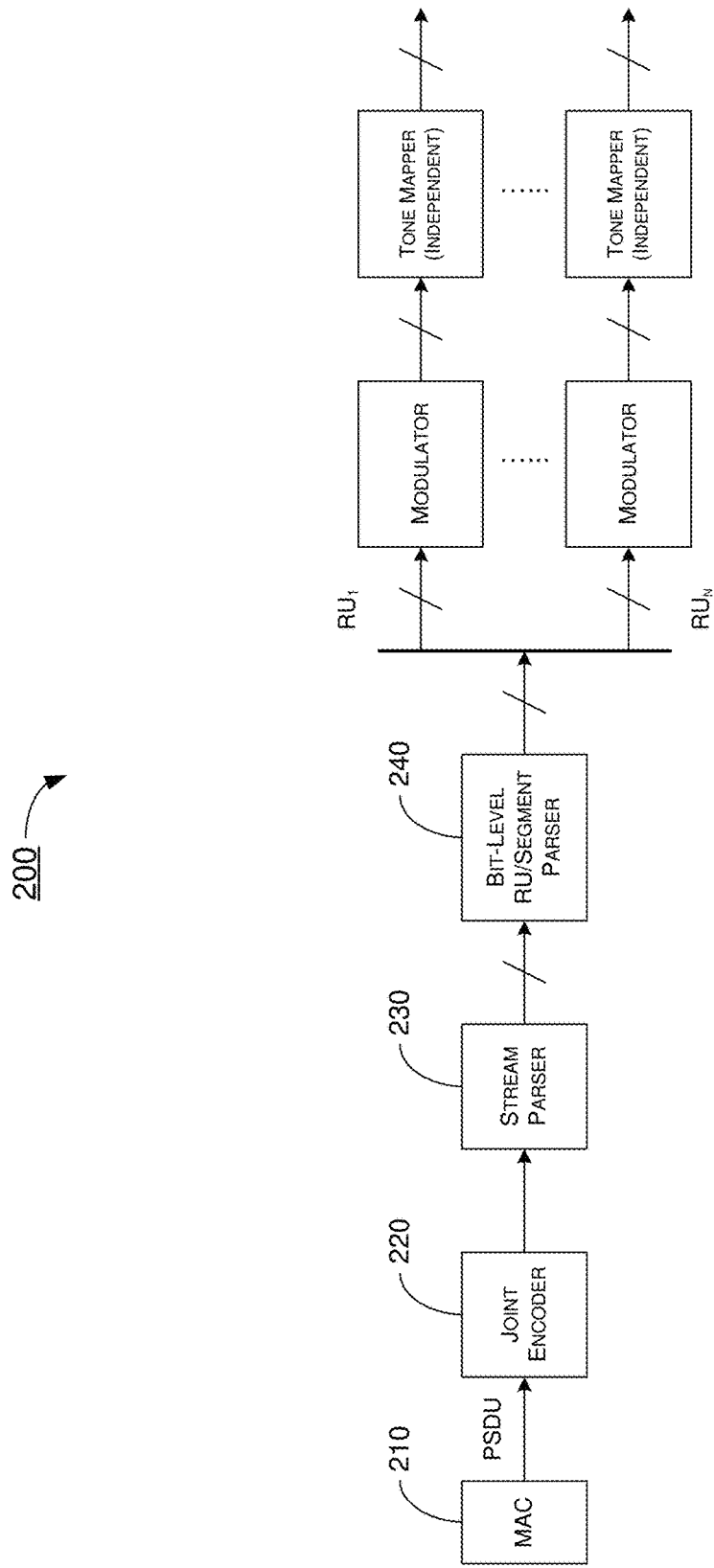
FIG. 2 is a diagram of an example design in accordance with the present disclosure.

FIG. 2 illustrates an example design 200 in accordance with the present disclosure. In general, a fundamental operation of multi-RU transmission may involve a number of operations described below with reference to FIG. 2. For instance, data for one STA (e.g., STA 110 or STA 120) to be transmitted over multiple RUs using one physical layer (PHY) service data unit (PSDU) may be provided by a medium access control layer (MAC) 210. Information bits for the multiple RUs may be jointly encoded by a joint encoder 220 to provide an encoded bit sequence to a stream parser 230 which may perform stream parsing to split or otherwise parse an input stream of encoded bits into different spatial streams. Then, depending on bandwidth and/or RU assignments and interleaving/tone-mapping schemes, a bit-level RU and segment (RU/segment) parser 240 may be operated per stream at bit level to allocate, distribute or otherwise parse the encoded bits onto each RU of the multiple RUs to be modulated and tone-mapped/interleaved for transmission on the assigned RUs.

Under a proposed scheme in accordance with the present disclosure, with respect to proportional round-robin RU parsing, a parameter $s=\max\{1, N_{bpscs}/2\}$ (herein referred to as the "s-bits") may be defined, where $N_{bpscs}$ denotes the number of coded bits per subcarrier per spatial stream. Thus, the value of s-bits may depend on the type of modulation used as $N_{bpscs}$ varies depending on the type of modulation used (e.g., $N_{bpscs}=2$ for quadrature phase shift keying (QPSK), $N_{bpscs}=4$ for 16 quadrature amplitude modulation (QAM)). Accordingly, parsing of coded bits to multiple RUs may be performed in a proportional round-robin fashion, with the parser ratio depending on the size (or number of tones) of each RU in the RU aggregation.

For instance, the parser ratio may be defined in the format of $m_0:m_1:m_2\ldots$ (or 1s:2s:3s ...), and each of $m_0$, $m_1$ and $m_2$ may be in units of s-bits. The proportional round-robin parser may operate as follows: first the parser may parse m0s-bits to a first RU (RU1), then parse m1s-bits to a second RU (RU2), ... and so on by alternatively distributing coded bits to each RU of multiple RUs. For some multi-RU combinations, in case there are remaining bits after alternatively allocating coded bits to each RU in the ratio of $m_0:m_1:\ldots$ (or 1s:2s:...), the remaining (leftover) bits may be assigned to each RU of relatively larger size(s). Moreover, the remaining/leftover bits may be further alternatively distributed to larger RU(s) (in case a number of larger RU(s) is equal to or greater than 2) with $m_1:m_2:m_3$ (or 2:2:2) ratio (in unit of s-bits, in case the larger RUs have equal size) to further improve system performance. Otherwise, the remaining/leftover bits may be sequentially or evenly distributed to each of the larger RU(s), as described below.

FIG. 3 illustrates an example scenario 300 in accordance with the present disclosure. In FIG. 3, a set of example combinations of RUs and corresponding parameters are shown in a table. For instance, for each example combination of multiple RUs, one corresponding parameter may be a total number of tones or data subcarriers ($N_{sd}$). Another corresponding parameter may be a proportional ratio between the RUs in the combination expressed as $N_{sd,0}:N_{sd,1}:N_{sd,2}:\ldots$ which is approximated to be m0:m1:m2:... with $m_i$ being an integer in units of s-bits, $0 \le i \le$ number of RUs combined—1. Thus, in the present disclosure, each expression of ratio such as $m_0:\ldots:m_n$ may be interchangeably replaced with an alternative expression of 1s: ... :ns, with n>1. A further corresponding parameter may be a number of leftover (or remaining) bits (per symbol), if any, after a stream of coded bits have been parsed to the combination of multiple RUs in a round-robin fashion.

Referring to FIG. 3, for some of the combinations of RUs, there may be leftover bits after parsing in a round-robin fashion while, for some other combinations of RUs, there may be no leftover bits after parsing in a round-robin fashion. In each of those combinations of multiple RUs having leftover bits, there may be at least one smaller RU and at least one larger RU in terms of number of tones. For instance, among the listed examples of combinations of multiple RUs, the following combinations may have leftover bits after parsing in a round-robin fashion: a combination of a smaller RU of 484 tones (RU484) plus a larger RU of 996 tones (RU996), a combination of an aggregate RU (having one RU of 242 tones (RU242) and one RU of 484 tones (RU484)), as a smaller RU, and a larger RU of 996 tones (RU996), a combination of one smaller RU of 484 tones (RU484) plus two larger RUs of 996 tones (RU996), a combination of one smaller RU of 484 tones (RU484) plus three larger RUs of 996 tones (RU996), and a combination of one smaller RU of 242 tones (RU242) plus one larger RU of 996 tones (RU996).

Figure 4:
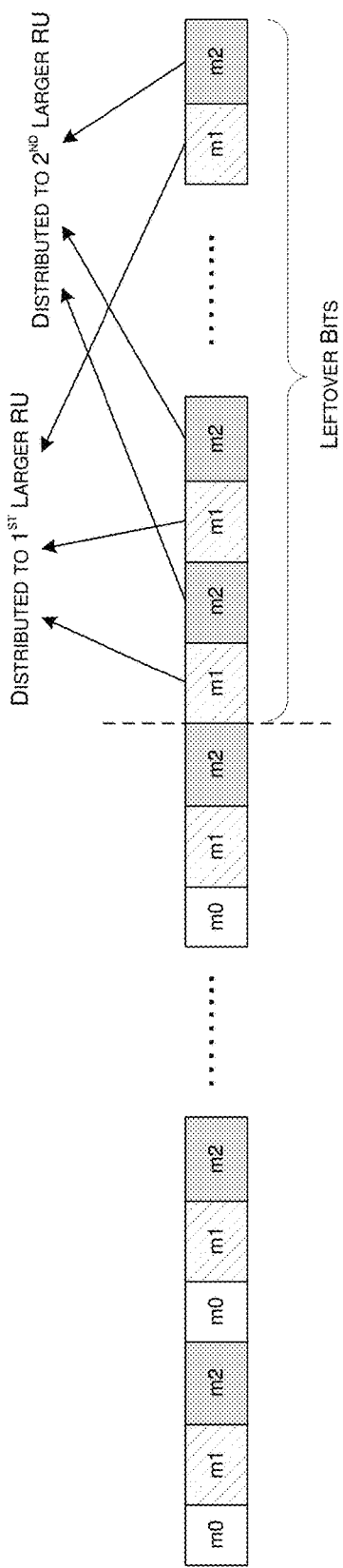
FIG. 4 is a diagram of an example scenario in accordance with the present disclosure.
Figure 5:
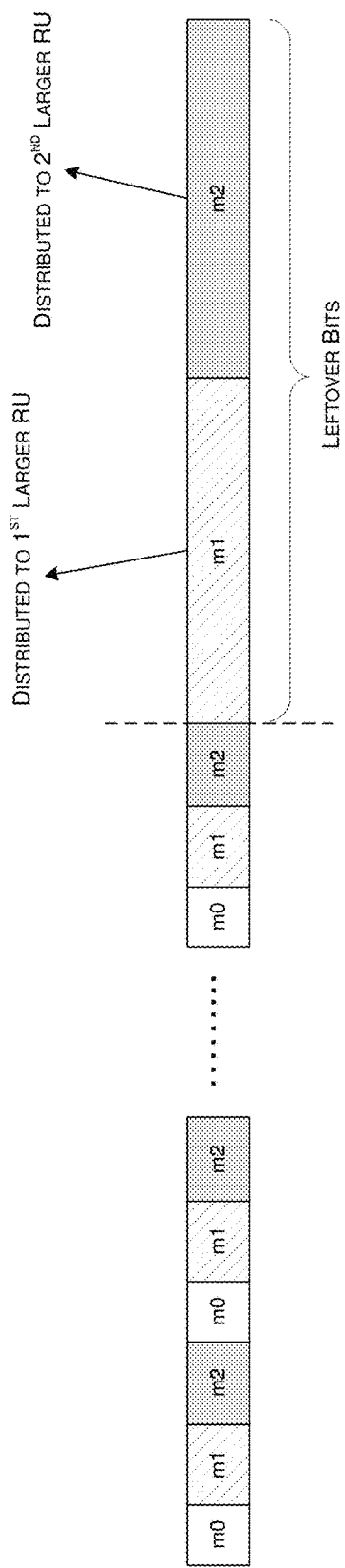
FIG. 5 is a diagram of an example scenario in accordance with the present disclosure.

Under a proposed scheme in accordance with the present disclosure, for a combination of multiple RUs having leftover bits after parsing in a round-robin fashion, the leftover bits may be distributed to the at least one larger RU of the combination of multiple RUs. For instance, under a first approach, the leftover bits may be proportionally distributed over last predefined number of tones (e.g., 44 tones) with the proportional ratio of $m_1:m_2: \ldots$ between the larger RUs (e.g., RU996's) of the combination of multiple RUs, as shown in FIG. 4. Under a second approach, the leftover bits may be sequentially distributed over last predefined number of tones (e.g., 44 tones) on each of the larger RUs (e.g., RU996's) of the combination of multiple RUs, as shown in FIG. 5. Under a third approach, the leftover bits may be evenly distributed over each of the larger RUs (e.g., RU996's) of the combination of multiple RUs, as shown in FIG. 6.

FIG. 4 illustrates an example scenario 400 in accordance with the present disclosure. In scenario 400, a stream of bits (e.g., coded bits of input data) may be parsed to a combination of multiple RUs having at least one smaller RU and at least one larger RU in a proportional round-robin fashion. Then, in an event of leftover bits remaining from the parsing in the proportional round-robin fashion, the leftover bits may be distributed to the at least one larger RU of the combination of multiple RUs. For instance, in the example shown in FIG. 4, the combination of multiple RUs may include one smaller RU (e.g., RU484) and two larger RUs (e.g., a first RU996 and a second RU996), with a proportional ratio of $m_0:m_1:m_2$ being 448:996:996 or 1:2:2. Thus, initially, the stream of bits may be parsed to the RU484, the first RU996 and the second RU996 of the combination of multiple RUs in a proportional round-robin fashion according to the proportional ratio of 1:2:2. Afterwards, under a proposed scheme in accordance with the present disclosure, the remaining leftover bits may be distributed over the last 44 tones between the first RU996 and the second RU996.

FIG. 5 illustrates an example scenario 500 in accordance with the present disclosure. In scenario 500, a stream of bits (e.g., coded bits of input data) may be parsed to a combination of multiple RUs having at least one smaller RU and at least one larger RU in a proportional round-robin fashion. Then, in an event of leftover bits remaining from the parsing in the proportional round-robin fashion, the leftover bits may be distributed to the at least one larger RU of the combination of multiple RUs. For instance, in the example shown in FIG. 5, the combination of multiple RUs may include one smaller RU (e.g., RU484) and two larger RUs (e.g., a first RU996 and a second RU996), with a proportional ratio of $m_0:m_1:m_2$ being 448:996:996 or 1:2:2. Thus, initially, the stream of bits may be parsed to the RU484, the first RU996 and the second RU996 of the combination of multiple RUs in a proportional round-robin fashion according to the proportional ratio of 1:2:2. Afterwards, under a proposed scheme in accordance with the present disclosure, the remaining leftover bits may be distributed over the last 44 tones on each of the first RU996 and the second RU996.

Figure 6:
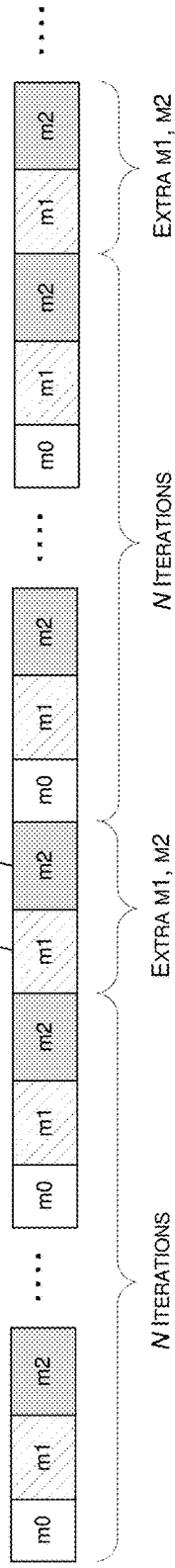
FIG. 6 is a diagram of an example scenario in accordance with the present disclosure.

FIG. 6 illustrates an example scenario 600 in accordance with the present disclosure. In scenario 600, a stream of bits (e.g., coded bits of input data) may be parsed to a combination of multiple RUs having at least one smaller RU and at least one larger RU in a proportional round-robin fashion. Then, in an event of leftover bits remaining from the parsing in the proportional round-robin fashion, the leftover bits may be distributed to the at least one larger RU of the combination of multiple RUs. For instance, in the example shown in FIG. 6, the combination of multiple RUs may include one smaller RU (e.g., RU484) and two larger RUs (e.g., a first RU996 and a second RU996), with a proportional ratio of $m_0:m_1:m_2$ being 448:996:996 or 1:2:2. Thus, under a proposed scheme in accordance with the present disclosure, for every N iterations (N>1) of parsing the stream of bits to the RU484, the first RU996 and the second RU996 of the combination of multiple RUs in a proportional round-robin fashion according to the proportional ratio of 1:2:2, one or more extra $m_2$ s-bits may be distributed to the first RU996 and one or more extra $m_3$ s-bits may be distributed to the second RU996.

Illustrative Implementations

Figure 7:
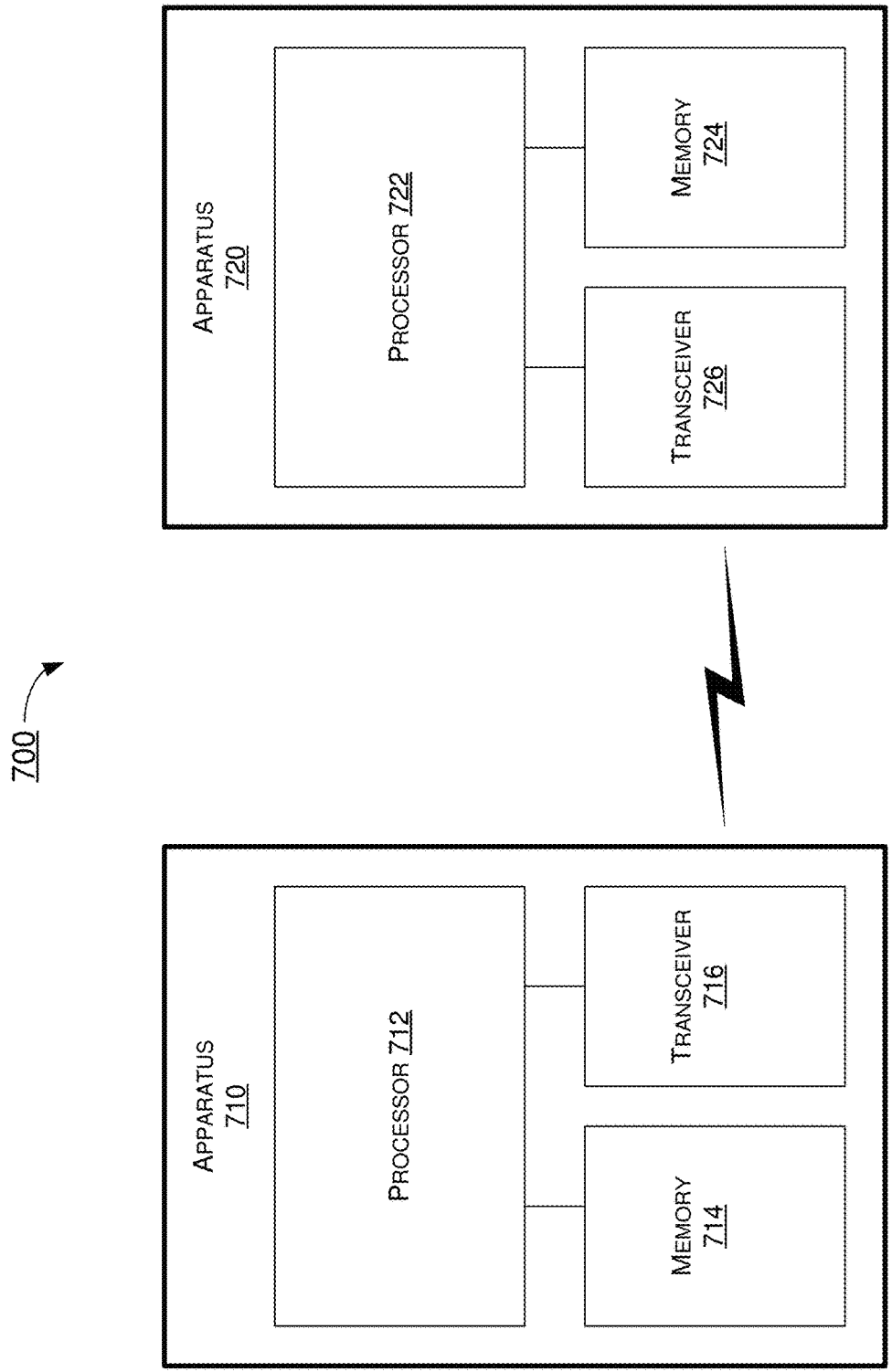
FIG. 7 is a block diagram of an example communication system in accordance with an implementation of the present disclosure.

FIG. 7 illustrates an example system 700 having at least an example apparatus 710 and an example apparatus 720 in accordance with an implementation of the present disclosure. Each of apparatus 710 and apparatus 720 may perform various functions to implement schemes, techniques, processes and methods described herein pertaining to leftover bits processing for proportional round-robin RU parsing in EHT systems, including the various schemes described above with respect to various proposed designs, concepts, schemes, systems and methods described above as well as processes described below. For instance, apparatus 710 may be implemented in STA 110 and apparatus 720 may be implemented in STA 120, or vice versa.

Each of apparatus 710 and apparatus 720 may be a part of an electronic apparatus, which may be a STA or an AP, such as a portable or mobile apparatus, a wearable apparatus, a wireless communication apparatus or a computing apparatus. When implemented in a STA, each of apparatus 710 and apparatus 720 may be implemented in a smartphone, a smart watch, a personal digital assistant, a digital camera, or a computing equipment such as a tablet computer, a laptop computer or a notebook computer. Each of apparatus 710 and apparatus 720 may also be a part of a machine type apparatus, which may be an IoT apparatus such as an immobile or a stationary apparatus, a home apparatus, a wire communication apparatus or a computing apparatus. For instance, each of apparatus 710 and apparatus 720 may be implemented in a smart thermostat, a smart fridge, a smart door lock, a wireless speaker or a home control center. When implemented in or as a network apparatus, apparatus 710 and/or apparatus 720 may be implemented in a network node, such as an AP in a WLAN.

In some implementations, each of apparatus 710 and apparatus 720 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. In the various schemes described above, each of apparatus 710 and apparatus 720 may be implemented in or as a STA or an AP. Each of apparatus 710 and apparatus 720 may include at least some of those components shown in FIG. 7 such as a processor 712 and a processor 722, respectively, for example. Each of apparatus 710 and apparatus 720 may further include one or more other components not pertinent to the proposed scheme of the present disclosure (e.g., internal power supply, display device and/or user interface device), and, thus, such component(s) of apparatus 710 and apparatus 720 are neither shown in FIG. 7 nor described below in the interest of simplicity and brevity.

In one aspect, each of processor 712 and processor 722 may be implemented in the form of one or more single-core processors, one or more multi-core processors, one or more RISC processors or one or more CISC processors. That is, even though a singular term "a processor" is used herein to refer to processor 712 and processor 722, each of processor 712 and processor 722 may include multiple processors in some implementations and a single processor in other implementations in accordance with the present disclosure. In another aspect, each of processor 712 and processor 722 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 712 and processor 722 is a special-purpose machine specifically designed, arranged and configured to perform specific tasks including those pertaining to leftover bits processing for proportional round-robin RU parsing in EHT systems in accordance with various implementations of the present disclosure.

In some implementations, apparatus 710 may also include a transceiver 716 coupled to processor 712. Transceiver 716 may include a transmitter capable of wirelessly transmitting and a receiver capable of wirelessly receiving data. In some implementations, apparatus 720 may also include a transceiver 726 coupled to processor 722. Transceiver 726 may include a transmitter capable of wirelessly transmitting and a receiver capable of wirelessly receiving data. It is noteworthy that, although transceiver 716 and transceiver 726 are illustrated as being external to and separate from processor 712 and processor 722, respectively, in some implementations, transceiver 716 may be an integral part of processor 712 as a system on chip (SoC) and/or transceiver 726 may be an integral part of processor 722 as a SoC.

In some implementations, apparatus 710 may further include a memory 714 coupled to processor 712 and capable of being accessed by processor 712 and storing data therein. In some implementations, apparatus 720 may further include a memory 724 coupled to processor 722 and capable of being accessed by processor 722 and storing data therein. Each of memory 714 and memory 724 may include a type of random-access memory (RAM) such as dynamic RAM (DRAM), static RAM (SRAM), thyristor RAM (T-RAM) and/or zero-capacitor RAM (Z-RAM). Alternatively, or additionally, each of memory 714 and memory 724 may include a type of read-only memory (ROM) such as mask ROM, programmable ROM (PROM), erasable programmable ROM (EPROM) and/or electrically erasable programmable ROM (EEPROM). Alternatively, or additionally, each of memory 714 and memory 724 may include a type of non-volatile random-access memory (NVRAM) such as flash memory, solid-state memory, ferroelectric RAM (FeRAM), magnetoresistive RAM (MRAM) and/or phase-change memory.

Each of apparatus 710 and apparatus 720 may be a communication entity capable of communicating with each other using various proposed schemes in accordance with the present disclosure. For illustrative purposes and without limitation, a description of capabilities of apparatus 710, as STA 110, and apparatus 720, as STA 120, is provided below. It is noteworthy that, although a detailed description of capabilities, functionalities and/or technical features of apparatus 710 is provided below, the same may be applied to apparatus 720 although a detailed description thereof is not provided solely in the interest of brevity. It is also noteworthy that, although the example implementations described below are provided in the context of WLAN, the same may be implemented in other types of networks.

Under a proposed scheme pertaining to leftover bits processing for proportional round-robin RU parsing in EHT systems in accordance with the present disclosure, with apparatus 710 implemented in or as STA 110 and apparatus 720 implemented in or as STA 120 in network environment 100, processor 712 of apparatus 710 may code data for a STA (e.g., STA 120) to provide a stream of bits. Additionally, processor 712 may process the stream of bits to provide processed bits. For instance, processor 712 may parse the stream of bits to a combination of multiple RUs which are assigned to the STA and, in an event of leftover bits remaining from the parsing, processor 712 may distribute the leftover bits to one or more RUs but not all RUs of the combination of multiple RUs. Moreover, processor 712 may wirelessly transmit, via transceiver 716, the processed bits to the STA over the combination of multiple RUs.

In some implementations, in parsing the stream of bits to the combination of multiple RUs, processor 712 may parse the stream of bits to the combination of multiple RUs in a proportional round-robin fashion.

In some implementations, the combination of multiple RUs may include at least one smaller RU and at least one larger RU with each of the at least one larger RU having more tones than the at least one smaller RU. In such cases, in distributing the leftover bits to one or more RUs but not all RUs of the combination of multiple RUs, processor 712 may distribute the leftover bits to the at least one larger RU.

In some implementations, in distributing the leftover bits to the at least one larger RU, processor 712 may proportionally distribute the leftover bits over last predefined number of tones on each of the at least one larger RU. For instance, processor 712 may proportionally distribute the leftover bits over last 44 tones on each of the at least one larger RU.

In some implementations, the combination of multiple RUs may include one smaller RU of 484 tones and one larger RU of 996 tones. In such cases, a proportional ratio of the multiple RUs may be 1:2 in units of s-bits and alternatively expressed as 1s:2s, with the remaining leftover bits distributed to the large RU of 996 tones.

In some implementations, the combination of multiple RUs may include one smaller RU of 484 tones and two larger RUs of 996 tones. In such cases, a proportional ratio of the multiple RUs may be 1:2:2 in units of s-bits or alternatively expressed as 1s:2s:2s, with the remaining leftover bits distributed to the two large RUs of 996 tones with a proportional ratio of 2:2 in units of s-bits or alternatively expressed as 2s:2s.

In some implementations, the combination of multiple RUs may include one smaller RU of 484 tones and three larger RUs of 996 tones. In such cases, a proportional ratio of the multiple RUs may be 1:2:2:2 in units of s-bits or alternatively expressed as 1s:2s:2s:2s, with the remaining leftover bits distributed to the three large RUs of 996 tones with a proportional ratio of 2:2:2 in units of s-bits or alternatively expressed as 2s:2s:2s.

In some implementations, the combination of multiple RUs may include one aggregated RU and one larger RU of 996 tones with the aggregated RU comprising one smaller RU of 242 tones and one smaller RU of 484 tones. In such cases, a proportional ratio of the multiple RUs may be 3:4 in units of s-bits or alternatively expressed as 3s:4s, with the remaining leftover bits distributed to the large RU of 996 tones.

In some implementations, the combination of multiple RUs may include one smaller RU of 242 tones and one larger RU of 996 tones. In such cases, a proportional ratio of the multiple RUs may be 1:4 in units of s-bits and alternatively expressed as 1s:4s.

Under a proposed scheme pertaining to leftover bits processing for proportional round-robin RU parsing in EHT systems in accordance with the present disclosure, with apparatus 710 implemented in or as STA 110 and apparatus 720 implemented in or as STA 120 in network environment 100, processor 712 of apparatus 710 may code data for a STA (e.g., STA 120) to provide a stream of bits. Additionally, processor 712 may process the stream of bits to provide processed bits. For instance, processor 712 may parse, in a proportional round-robin fashion, the stream of bits to a combination of multiple RUs which are assigned to the STA and may include at least one smaller RU and at least one larger RU with each of the at least one larger RU having more tones than the at least one smaller RU. Moreover, in an event of leftover bits remaining from the parsing in the proportional round-robin fashion, processor 712 may distribute the leftover bits to one or more RUs but not all RUs of the combination of multiple RUs (e.g., to the at least one larger RU). Furthermore, processor 712 may wirelessly transmit, via transceiver 716, the processed bits to the STA over the combination of multiple RUs.

In some implementations, in distributing the leftover bits to the at least one larger RU, processor 712 may proportionally distribute the leftover bits over last 44 tones on each of the at least one larger RU.

In some implementations, in distributing the leftover bits to the at least one larger RU, processor 712 may sequentially distribute the leftover bits over last 44 tones on each of the at least one larger RU.

In some implementations, in distributing the leftover bits to the at least one larger RU, processor 712 may evenly distribute the leftover bits over each of the at least one larger RU. For instance, in evenly distributing the leftover bits over each of the at least one larger RU, processor 712 may, for every N iterations of parsing the stream of bits to the combination of multiple RUs in the proportional round-robin fashion, distribute the leftover bits over each of the at least one larger RU, with N being an integer equal to or greater than 1.

In some implementations, the combination of multiple RUs may include one smaller RU of 484 tones and one larger RU of 996 tones. In such cases, a proportional ratio of the multiple RUs may be 1:2 in units of s-bits and alternatively expressed as 1s:2s, with the remaining leftover bits distributed to the large RU of 996 tones.

In some implementations, the combination of multiple RUs may include one smaller RU of 484 tones and two larger RUs of 996 tones. In such cases, a proportional ratio of the multiple RUs may be 1:2:2 in units of s-bits or alternatively expressed as 1s:2s:2s, with the remaining leftover bits distributed to the two large RUs of 996 tones with a proportional ratio of 2:2 in units of s-bits or alternatively expressed as 2s:2s.

In some implementations, the combination of multiple RUs may include one smaller RU of 484 tones and three larger RUs of 996 tones. In such cases, a proportional ratio of the multiple RUs may be 1:2:2:2 in units of s-bits or alternatively expressed as 1s:2s:2s:2s, with the remaining leftover bits distributed to the three large RUs of 996 tones with a proportional ratio of 2:2:2 in units of s-bits or alternatively expressed as 2s:2s:2s.

In some implementations, the combination of multiple RUs may include one aggregated RU and one larger RU of 996 tones with the aggregated RU comprising one smaller RU of 242 tones and one smaller RU of 484 tones. In such cases, a proportional ratio of the multiple RUs may be 3:4 in units of s-bits or alternatively expressed as 3s:4s, with the remaining leftover bits distributed to the large RU of 996 tones.

In some implementations, the combination of multiple RUs may include one smaller RU of 242 tones and one larger RU of 996 tones. In such cases, a proportional ratio of the multiple RUs may be 1:4 in units of s-bits and alternatively expressed as 1s:4s.

Illustrative Processes

Figure 8:
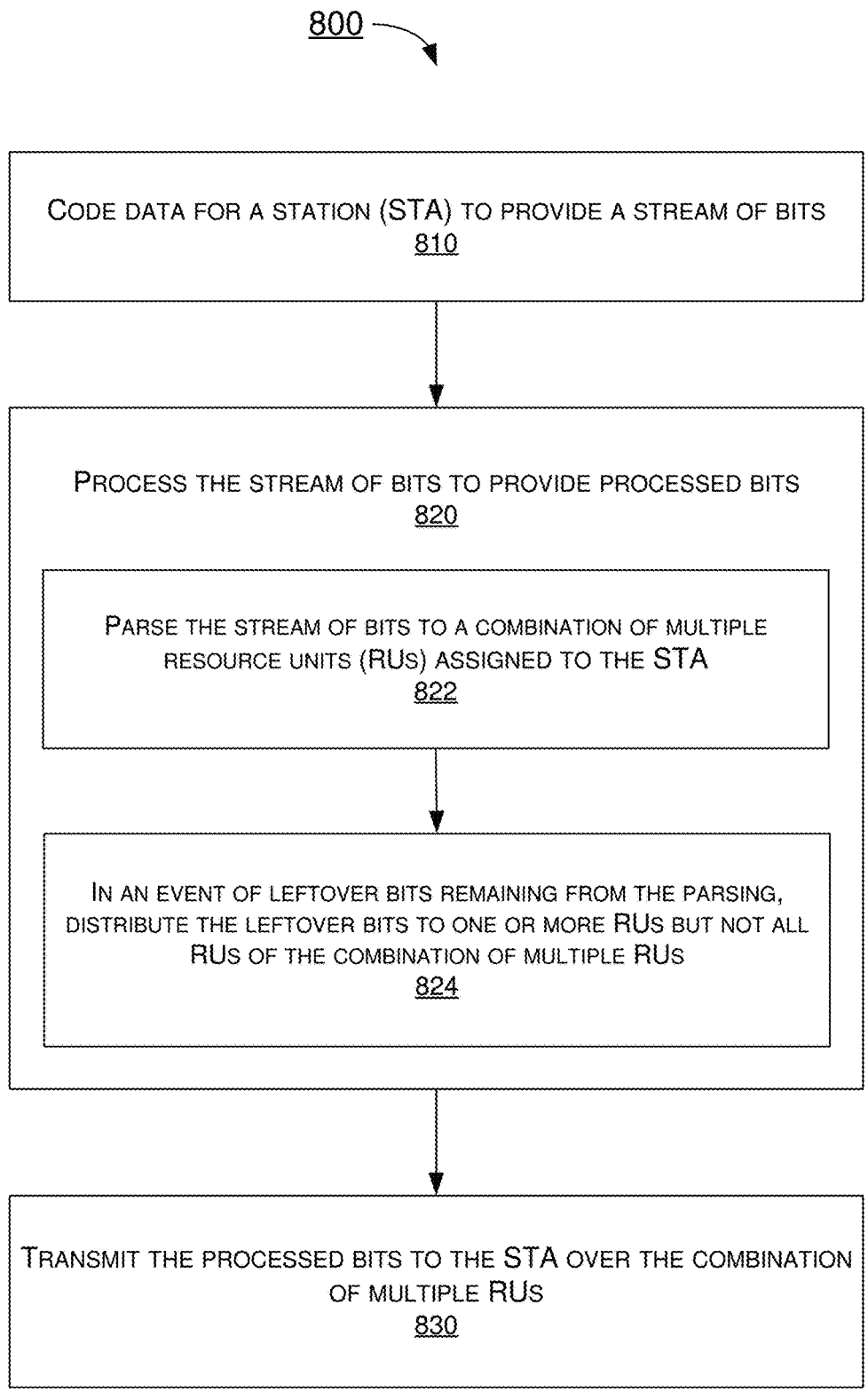
FIG. 8 is a flowchart of an example process in accordance with an implementation of the present disclosure.

FIG. 8 illustrates an example process 800 in accordance with an implementation of the present disclosure. Process 800 may represent an aspect of implementing various proposed designs, concepts, schemes, systems and methods described above. More specifically, process 800 may represent an aspect of the proposed concepts and schemes pertaining to leftover bits processing for proportional round-robin RU parsing in EHT systems in accordance with the present disclosure. Process 800 may include one or more operations, actions, or functions as illustrated by one or more of blocks 810, 820 and 830 as well as sub-blocks 822 and 824. Although illustrated as discrete blocks, various blocks of process 800 may be divided into additional blocks, combined into fewer blocks, or eliminated, depending on the desired implementation. Moreover, the blocks/sub-blocks of process 800 may be executed in the order shown in FIG. 8 or, alternatively in a different order. Furthermore, one or more of the blocks/sub-blocks of process 800 may be executed repeatedly or iteratively. Process 800 may be implemented by or in apparatus 710 and apparatus 720 as well as any variations thereof. Solely for illustrative purposes and without limiting the scope, process 800 is described below in the context of apparatus 710 implemented in or as STA 110 and apparatus 720 implemented in or as STA 120 of a wireless network such as a WLAN in network environment 100 in accordance with one or more of IEEE 802.11 standards. Process 800 may begin at block 810.

At 810, process 800 may involve processor 712 of apparatus 710 (e.g., STA 110) coding data for a STA (e.g., STA 120) to provide a stream of bits. Process 800 may proceed from 810 to 820.

At 820, process 800 may involve processor 712 processing the stream of bits to provide processed bits by performing operations represented by 822 and 824. Process 800 may proceed from 820 to 830.

At 830, process 800 may involve processor 712 transmitting, via transceiver 716, the processed bits to the STA over a combination of multiple RUs which are assigned to the STA.

At 822, process 800 may involve processor 712 parsing the stream of bits to the combination of multiple RUs. Process 800 may proceed from 822 to 824.

At 824, in an event of leftover bits remaining from the parsing, process 800 may involve processor 712 distributing the leftover bits to one or more RUs but not all RUs of the combination of multiple RUs.

In some implementations, in parsing the stream of bits to the combination of multiple RUs, process 800 may involve processor 712 parsing the stream of bits to the combination of multiple RUs in a proportional round-robin fashion.

In some implementations, the combination of multiple RUs may include at least one smaller RU and at least one larger RU with each of the at least one larger RU having more tones than the at least one smaller RU. In such cases, in distributing the leftover bits to one or more RUs but not all RUs of the combination of multiple RUs, process 800 may involve processor 712 distributing the leftover bits to the at least one larger RU.

In some implementations, in distributing the leftover bits to the at least one larger RU, process 800 may involve processor 712 proportionally distributing the leftover bits over last predefined number of tones on each of the at least one larger RU. For instance, process 800 may involve processor 712 proportionally distributing the leftover bits over last 44 tones on each of the at least one larger RU.

In some implementations, the combination of multiple RUs may include one smaller RU of 484 tones and one larger RU of 996 tones. In such cases, a proportional ratio of the multiple RUs may be 1:2 in units of s-bits and alternatively expressed as 1s:2s, with the remaining leftover bits distributed to the large RU of 996 tones.

In some implementations, the combination of multiple RUs may include one smaller RU of 484 tones and two larger RUs of 996 tones. In such cases, a proportional ratio of the multiple RUs may be 1:2:2 in units of s-bits or alternatively expressed as 1s:2s:2s, with the remaining leftover bits distributed to the two large RUs of 996 tones with a proportional ratio of 2:2 in units of s-bits or alternatively expressed as 2s:2s.

In some implementations, the combination of multiple RUs may include one smaller RU of 484 tones and three larger RUs of 996 tones. In such cases, a proportional ratio of the multiple RUs may be 1:2:2:2 in units of s-bits or alternatively expressed as 1s:2s:2s:2s, with the remaining leftover bits distributed to the three large RUs of 996 tones with a proportional ratio of 2:2:2 in units of s-bits or alternatively expressed as 2s:2s:2s.

In some implementations, the combination of multiple RUs may include one aggregated RU and one larger RU of 996 tones with the aggregated RU comprising one smaller RU of 242 tones and one smaller RU of 484 tones. In such cases, a proportional ratio of the multiple RUs may be 3:4 in units of s-bits or alternatively expressed as 3s:4s, with the remaining leftover bits distributed to the large RU of 996 tones.

In some implementations, the combination of multiple RUs may include one smaller RU of 242 tones and one larger RU of 996 tones. In such cases, a proportional ratio of the multiple RUs may be 1:4 in units of s-bits and alternatively expressed as 1s:4s.

Figure 9:
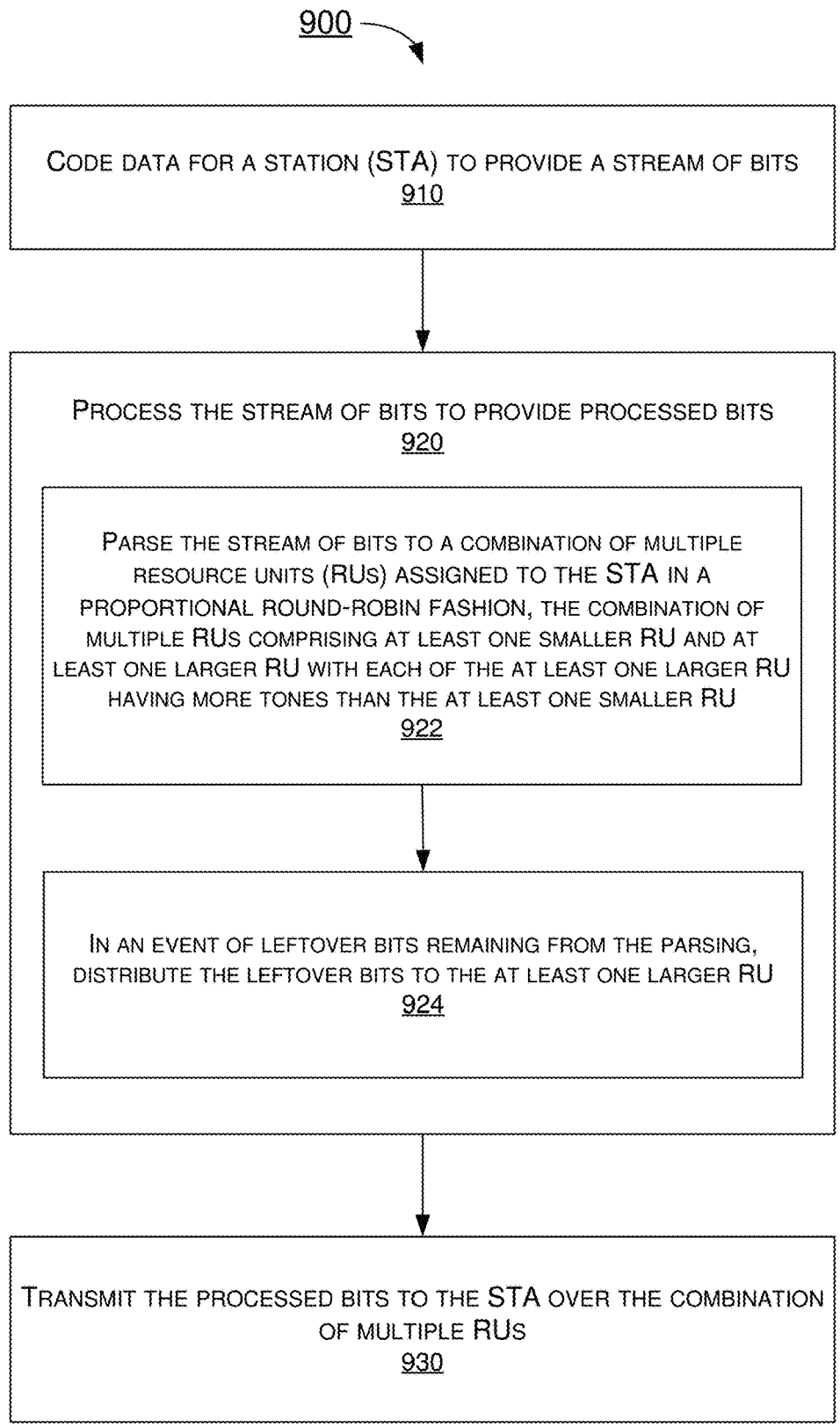
FIG. 9 is a flowchart of an example process in accordance with an implementation of the present disclosure.

FIG. 9 illustrates an example process 900 in accordance with an implementation of the present disclosure. Process 900 may represent an aspect of implementing various proposed designs, concepts, schemes, systems and methods described above. More specifically, process 900 may represent an aspect of the proposed concepts and schemes pertaining to leftover bits processing for proportional round-robin RU parsing in EHT systems in accordance with the present disclosure. Process 900 may include one or more operations, actions, or functions as illustrated by one or more of blocks 910, 920 and 930 as well as sub-blocks 922 and 924. Although illustrated as discrete blocks, various blocks of process 900 may be divided into additional blocks, combined into fewer blocks, or eliminated, depending on the desired implementation. Moreover, the blocks/sub-blocks of process 900 may be executed in the order shown in FIG. 9 or, alternatively in a different order. Furthermore, one or more of the blocks/sub-blocks of process 900 may be executed repeatedly or iteratively. Process 900 may be implemented by or in apparatus 710 and apparatus 720 as well as any variations thereof. Solely for illustrative purposes and without limiting the scope, process 900 is described below in the context of apparatus 710 implemented in or as STA 110 and apparatus 720 implemented in or as STA 120 of a wireless network such as a WLAN in network environment 100 in accordance with one or more of IEEE 802.11 standards. Process 900 may begin at block 910.

At 910, process 900 may involve processor 712 of apparatus 710 (e.g., STA 110) coding data for a STA (e.g., STA 120) to provide a stream of bits. Process 900 may proceed from 910 to 920.

At 920, process 900 may involve processor 712 processing the stream of bits to provide processed bits by performing operations represented by 922 and 924. Process 900 may proceed from 920 to 930.

At 930, process 900 may involve processor 712 transmitting, via transceiver 716, the processed bits to the STA over a combination of multiple RUs which are assigned to the STA and may include at least one smaller RU and at least one larger RU with each of the at least one larger RU having more tones than the at least one smaller RU.

At 922, process 900 may involve processor 712 parsing the stream of bits to the combination of multiple RUs in a proportional round-robin fashion. Process 900 may proceed from 922 to 924.

At 924, in an event of leftover bits remaining from the parsing in the proportional round-robin fashion, process 900 may involve processor 712 distributing the leftover bits to one or more RUs but not all RUs of the combination of multiple RUs (e.g., to the at least one larger RU).

In some implementations, in distributing the leftover bits to the at least one larger RU, process 900 may involve processor 712 proportionally distributing the leftover bits over last 44 tones on each of the at least one larger RU.

In some implementations, in distributing the leftover bits to the at least one larger RU, process 900 may involve processor 712 sequentially distributing the leftover bits over last 44 tones on each of the at least one larger RU.

In some implementations, in distributing the leftover bits to the at least one larger RU, process 900 may involve processor 712 evenly distributing the leftover bits over each of the at least one larger RU. For instance, in evenly distributing the leftover bits over each of the at least one larger RU, process 900 may involve processor 712, for every N iterations of parsing the stream of bits to the combination of multiple RUs in the proportional round-robin fashion, distributing the leftover bits over each of the at least one larger RU, with N being an integer equal to or greater than 1.

In some implementations, the combination of multiple RUs may include one smaller RU of 484 tones and one larger RU of 996 tones. In such cases, a proportional ratio of the multiple RUs may be 1:2 in units of s-bits and alternatively expressed as 1s:2s, with the remaining leftover bits distributed to the large RU of 996 tones.

In some implementations, the combination of multiple RUs may include one smaller RU of 484 tones and two larger RUs of 996 tones. In such cases, a proportional ratio of the multiple RUs may be 1:2:2 in units of s-bits or alternatively expressed as 1s:2s:2s, with the remaining leftover bits distributed to the two large RUs of 996 tones with a proportional ratio of 2:2 in units of s-bits or alternatively expressed as 2s:2s.

In some implementations, the combination of multiple RUs may include one smaller RU of 484 tones and three larger RUs of 996 tones. In such cases, a proportional ratio of the multiple RUs may be 1:2:2:2 in units of s-bits or alternatively expressed as 1s:2s:2s:2s, with the remaining leftover bits distributed to the three large RUs of 996 tones with a proportional ratio of 2:2:2 in units of s-bits or alternatively expressed as 2s:2s:2s.

In some implementations, the combination of multiple RUs may include one aggregated RU and one larger RU of 996 tones with the aggregated RU comprising one smaller RU of 242 tones and one smaller RU of 484 tones. In such cases, a proportional ratio of the multiple RUs may be 3:4 in units of s-bits or alternatively expressed as 3s:4s, with the remaining leftover bits distributed to the large RU of 996 tones.

In some implementations, the combination of multiple RUs may include one smaller RU of 242 tones and one larger RU of 996 tones. In such cases, a proportional ratio of the multiple RUs may be 1:4 in units of s-bits and alternatively expressed as 1s:4s.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. An apparatus, comprising:
a transceiver configured to communicate wirelessly; and
a processor coupled to the transceiver and configured to perform operations comprising:
   processing a stream of bits to provide processed bits; and
   transmitting, via the transceiver, the processed bits to a station (STA) over a combination of multiple resource units (RUs) assigned to the STA,
wherein, in processing the stream of bits, the processor is configured to perform operations comprising:
   parsing the stream of bits to the combination of multiple RUs comprising at least one smaller RU of 242 or 484 tones and at least one larger RU of 996 tones; and
   in an event of leftover bits remaining from the parsing, a proportional round-robin parser distributing the leftover bits to one or more RUs but not all RUs of the combination of multiple RUs such that the leftover bits are distributed to the at least one larger RU but not the at least one smaller RU,
wherein the combination of multiple RUs comprises a first combination, a second combination, a third combination or a fourth combination,
wherein the first combination comprises one smaller RU of 484 tones and two larger RUs of 996 tones,
wherein the second combination comprises one smaller RU of 484 tones and three larger RUs of 996 tones,
wherein the third combination comprises one aggregated RU and one larger RU of 996 tones with the aggregated RU comprising one smaller RU of 242 tones and one smaller RU of 484 tones, and wherein the fourth combination comprises one smaller RU of 242 tones and one larger RU of 996 tones.

2. The apparatus of claim 1, wherein, in parsing the stream of bits to the combination of multiple RUs, the processor is configured to parse the stream of bits to the combination of multiple RUs in a proportional round-robin fashion.

3. The apparatus of claim 1, wherein the combination of multiple RUs comprises at least one smaller RU and at least one larger RU with the at least one larger RU having more tones than the at least one smaller RU, and wherein the distributing of the leftover bits to one or more RUs but not all RUs of the combination of multiple RUs comprises distributing the leftover bits to the at least one larger RU.

4. The apparatus of claim 3, wherein, in distributing the leftover bits to the at least one larger RU, the processor is configured to proportionally distribute the leftover bits over last predefined number of tones on each of the at least one larger RU.

5. The apparatus of claim 4, wherein the proportionally distributing of the leftover bits over last predefined number of tones on each of the at least one larger RU comprises proportionally distributing the leftover bits over last 44 tones on each of the at least one larger RU.

6. The apparatus of claim 1, wherein the combination of multiple RUs comprises one smaller RU of 484 tones and one larger RU of 996 tones, and wherein a proportional ratio of the multiple RUs is 1:2 in units of s-bits and alternatively expressed as 1s:2s, with the remaining leftover bits distributed to the large RU of 996 tones.

7. The apparatus of claim 1, wherein, responsive to the combination of multiple RUs comprising the first combination, a proportional ratio of the multiple RUs is 1:2:2 in units of s-bits or alternatively expressed as 1s:2s:2s, with the remaining leftover bits distributed to the two large RUs of 996 tones with a proportional ratio of 2:2 in units of s-bits or alternatively expressed as 2s:2s.

8. The apparatus of claim 1, wherein, responsive to the combination of multiple RUs comprising the second combination, a proportional ratio of the multiple RUs is 1:2:2:2 in units of s-bits or alternatively expressed as 1s:2s:2s:2s, with the remaining leftover bits distributed to the three large RUs of 996 tones with a proportional ratio of 2:2:2 in units of s-bits or alternatively expressed as 2s:2s:2s.

9. The apparatus of claim 1, wherein, responsive to the combination of multiple RUs comprising the third combination, a proportional ratio of the multiple RUs is 3:4 in units of s-bits or alternatively expressed as 3s:4s, with the remaining leftover bits distributed to the large RU of 996 tones.

10. The apparatus of claim 1, wherein, responsive to the combination of multiple RUs comprising the fourth combination, a proportional ratio of the multiple RUs is 1:4 in units of s-bits and alternatively expressed as 1s:4s.

11. An apparatus, comprising:
a transceiver configured to communicate wirelessly; and
a processor coupled to the transceiver and configured to perform operations comprising:
processing a stream of bits to provide processed bits; and
transmitting, via the transceiver, the processed bits to a station (STA) over a combination of multiple resource units (RUs) assigned to the STA,
wherein the combination of multiple RUs comprises at least one smaller RU and at least one larger RU with the at least one larger RU having more tones than the at least one smaller RU,
wherein, in processing the stream of bits, the processor is configured to perform operations comprising:
parsing the stream of bits to the combination of multiple RUs in a proportional round-robin fashion; and
in an event of leftover bits remaining from the parsing in the proportional round-robin fashion, distributing the leftover bits to the at least one larger RU,
wherein the combination of multiple RUs comprises a first combination, a second combination, a third combination or a fourth combination,
wherein the first combination comprises one smaller RU of 484 tones and two larger RUs of 996 tones,
wherein the second combination comprises one smaller RU of 484 tones and three larger RUs of 996 tones,
wherein the third combination comprises one aggregated RU and one larger RU of 996 tones with the aggregated RU comprising one smaller RU of 242 tones and one smaller RU of 484 tones, and
wherein the fourth combination comprises one smaller RU of 242 tones and one larger RU of 996 tones.

12. The apparatus of claim 11, wherein, in distributing the leftover bits to the at least one larger RU, the processor is configured to proportionally distribute the leftover bits over last 44 tones on the at least one larger RU.

13. The apparatus of claim 11, wherein, in distributing the leftover bits to the at least one larger RU, the processor is configured to sequentially distribute the leftover bits over last 44 tones on the at least one larger RU.

14. The apparatus of claim 11, wherein the combination of multiple RUs comprises one smaller RU of 484 tones and one larger RU of 996 tones, and wherein a proportional ratio of the multiple RUs is 1:2 in units of s-bits and alternatively expressed as 1s:2s, with the remaining leftover bits distributed to the large RU of 996 tones.

15. The apparatus of claim 11, wherein, responsive to the combination of multiple RUs comprising the first combination, a proportional ratio of the multiple RUs is 1:2:2 in units of s-bits or alternatively expressed as 1s:2s:2s, with the remaining leftover bits distributed to the two large RUs of 996 tones with a proportional ratio of 2:2 in units of s-bits or alternatively expressed as 2s:2s.

16. The apparatus of claim 11, wherein, responsive to the combination of multiple RUs comprising the second combination, a proportional ratio of the multiple RUs is 1:2:2:2 in units of s-bits or alternatively expressed as 1s:2s:2s:2s, with the remaining leftover bits distributed to the three large RUs of 996 tones with a proportional ratio of 2:2:2 in units of s-bits or alternatively expressed as 2s:2s:2s.

17. The apparatus of claim 11, wherein, responsive to the combination of multiple RUs comprising the third combination, a proportional ratio of the multiple RUs is 3:4 in units of s-bits or alternatively expressed as 3s:4s, with the remaining leftover bits distributed to the large RU of 996 tones.

18. The apparatus of claim 11, wherein, responsive to the combination of multiple RUs comprising the fourth combination, a proportional ratio of the multiple RUs is 1:4 in units of s-bits and alternatively expressed as 1s:4s.

19. A method, comprising:
processing a stream of bits to provide processed bits; and
transmitting the processed bits to a station (STA) over a combination of multiple resource units (RUs) assigned to the STA,
wherein the processing of the stream of bits comprises:
parsing the stream of bits to the combination of multiple RUs; and in an event of leftover bits remaining from the parsing, distributing the leftover bits to one or more RUs but not all RUs of the combination of multiple RUs, wherein the combination of multiple RUs comprises at least one smaller RU and at least one larger RU with the at least one larger RU having more tones than the at least one smaller RU, wherein the distributing of the leftover bits comprises, for N iterations of parsing the stream of bits to the combination of multiple RUs, distributing the leftover bits over the at least one larger RU, and wherein N is an integer equal to or greater than 1.

* * * * *